US010293514B2

(12) United States Patent
Mortaro et al.

(10) Patent No.: US 10,293,514 B2
(45) Date of Patent: May 21, 2019

(54) CAM ACTUATED GUARD FOR A SAW

(71) Applicant: Black & Decker Inc., New Britain, CT (US)

(72) Inventors: Matteo Mortaro, Marsciano (IT); Lucio Ginocchini, San Sisto (IT); Marcello Bettacchini, Ellera di Corciano (IT)

(73) Assignee: BLACK & DECKER INC., New Britain, CT (US)

( * ) Notice: Subject to any disclaimer, the term of this patent is extended or adjusted under 35 U.S.C. 154(b) by 219 days.

(21) Appl. No.: 15/333,478

(22) Filed: Oct. 25, 2016

(65) Prior Publication Data
US 2017/0136652 A1    May 18, 2017

(51) Int. Cl.
*B27G 19/02* (2006.01)
*B23D 45/02* (2006.01)

(52) U.S. Cl.
CPC ........... *B27G 19/02* (2013.01); *B23D 45/024* (2013.01)

(58) Field of Classification Search
CPC ................................ B27G 19/02; B23D 45/024
See application file for complete search history.

(56) References Cited

U.S. PATENT DOCUMENTS

| 3,880,032 A * | 4/1975 | Green | B27G 19/02 |
| | | | 83/102.1 |
| 3,998,121 A * | 12/1976 | Bennett | B23D 45/044 |
| | | | 83/471.3 |
| 4,774,866 A * | 10/1988 | Dehari | B27G 19/02 |
| | | | 144/251.1 |
| 4,805,504 A * | 2/1989 | Fushiya | B27G 19/02 |
| | | | 83/397 |
| 5,203,245 A * | 4/1993 | Terpstra | B23D 45/044 |
| | | | 83/397 |
| 5,257,570 A * | 11/1993 | Shiotani | B23D 45/044 |
| | | | 83/471.3 |

(Continued)

FOREIGN PATENT DOCUMENTS

| EP | 0875347 A2 | 11/1998 |
| EP | 1033211 A2 | 9/2000 |
| GB | 2203093 A | 10/1988 |

OTHER PUBLICATIONS

Pascal Hamel, European Search Report, dated Mar. 13, 2017, The Hague.

(Continued)

*Primary Examiner* — Sean Michalski
*Assistant Examiner* — Fernando Ayala
(74) *Attorney, Agent, or Firm* — Adan Ayala

(57) ABSTRACT

A saw with a pivotal guard which can pivot from a first position surrounds at least a portion of the lower edge of the saw blade to a second retracted position where the portion of the lower edge of the saw blade is exposed. A biasing mechanism may be provided for biasing the pivotal guard towards the first position. A pivotal guard actuating mechanism is capable of moving the pivotal guard from the first position to the second retracted position. The pivotal guard actuation mechanism includes a hand lever, a cam mechanism comprising a cam and cam follower connected between the hand lever and the pivotal guard wherein the cam is connected to the pivotal guard and the cam follower is connected to the hand lever.

6 Claims, 5 Drawing Sheets

(56) References Cited

U.S. PATENT DOCUMENTS

| | | | | | |
|---|---|---|---|---|---|
| 5,370,025 | A | * | 12/1994 | Itzov | B27G 19/02 |
| | | | | | 83/397 |
| 5,377,025 | A | * | 12/1994 | Spaulding | H04N 1/60 |
| | | | | | 358/518 |
| 5,609,085 | A | * | 3/1997 | Chang | B27G 19/02 |
| | | | | | 83/397 |
| 5,724,875 | A | * | 3/1998 | Meredith | B23D 45/046 |
| | | | | | 83/397 |
| 5,725,421 | A | * | 3/1998 | Goers | B24B 5/42 |
| | | | | | 451/303 |
| 5,937,720 | A | * | 8/1999 | Itzov | B23D 45/048 |
| | | | | | 83/397 |
| 5,957,021 | A | * | 9/1999 | Meredith | B23D 45/048 |
| | | | | | 83/397 |
| 6,485,699 | B2 | * | 11/2002 | Angaiah | C01B 25/45 |
| | | | | | 423/306 |

OTHER PUBLICATIONS

Annex to the European Search Report on European Patent Application No. EP 16 19 1937, dated Mar. 3, 2017.

* cited by examiner

CAM ACTUATED GUARD FOR A SAW

FIELD OF THE INVENTION

The present invention relates to saws, and in particular to chop saws or saws having a chopping function, for example, a sliding compound mitre saws, and more in particular to guard mechanisms for such saws.

BACKGROUND

Chop saws comprise a cutting unit pivotally mounted on a base assembly. The cutting unit is located above the base and can pivot between a high position where it is located further most away from the base assembly to a low position where a circular saw blade, which is mounted on the cutting unit and which is capable of being rotationally driven by a motor located within the cutting unit, can engage with a work piece located on the base assembly. A spring biases the cutting unit to its uppermost position.

Such chop saws can have a sliding feature wherein the cutting unit, in addition to be able to perform a pivotal or chopping movement, can slide linearly across the base assembly to perform a slide cut. Furthermore, these types of saw can include mechanisms by which they are able to perform miter and/or bevel cuts on workpieces located on the base assembly. A saw which is capable of performing chop, sliding, bevel and miter cuts is known as a sliding compound miter saw.

All of these types of saw usually comprise guards which surround at least a part of the edge of the saw blade in order to prevent the operator from touching the cutting edge. Typically, such saws comprise a fixed guard which surrounds the cutting edge of the top half of the cutting blade and a pivotal guard which is capable of surrounding the cutting edge of the lower half of the cutting blade. The pivotal guard is capable of being pivoted from a first position where it surrounds the cutting edge of the lower half of the cutting blade to a retracted position where the cutting edge of the lower half of the cutting blade is exposed so that the cutting blade can be used to cut a work piece. The purpose of the pivotal guard is to enable the cutting edge of the lower half of the circular saw blade to be surrounded when the saw blade is not being used to provide protection to the operator while allowing the cutting edge of the lower half of the circular saw blade to be exposed when it is required to perform the cutting function.

There are numerous mechanisms by which the pivotal guard can be pivoted from its first position to a retracted position.

EP0242733 discloses a sliding compound miter saw which comprises a base having a rotatable table mounted within it. The rotatable table, in conjunction with a fence fixed to the base, enables the sliding compound miter saw to perform miter cuts. Connected to the rear of the table is a bevel mount which is able to pivot about a horizontal axis in relation to the table. The pivotal movement of the bevel mount in relation to the table enables the sliding compound miter saw to perform bevel cuts.

Pivotally mounted onto the bevel mount are two guide rods which are capable of pivoting about an axis, parallel to the axis of rotation of the saw blade of the saw, between an upper and lower position. This enables the saw to perform chop cuts.

Slidingly mounted on the guide rods is a cutting unit, which comprises a motor for rotationally driving the circular saw blade mounted on a drive spindle on the motor unit. The sliding movement of the motor unit along the guide rods enables the saw to perform sliding cuts.

Rigidly mounted to the cutting unit is a fixed guard which surrounds the cutting edge of the top half of the cutting blade. Pivotally mounted to the cutting unit is a pivotal guard which can pivot between a first position where it surrounds the cutting edge of the lower half of the cutting blade and a retracted position where the cutting edge of the lower half of the blade is exposed for use in cutting.

The pivotal guard is pivoted between its two positions using a switch mounted on the handle which is mechanically linked to the pivotal guard. In use, the switch is depressed retracting the pivotal guard and then the saw can be operated.

DESCRIPTION

Figure 1:
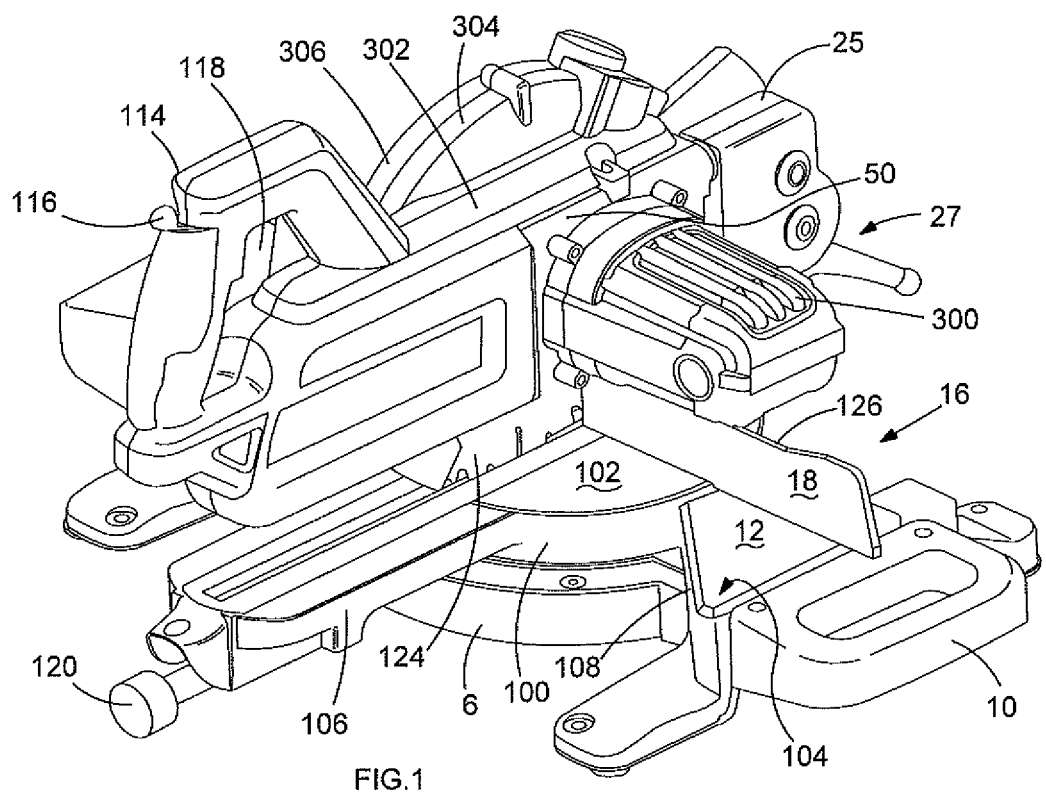
FIG. 1 shows a perspective view of a miter saw.

Referring to FIG. 1, the miter saw comprises a base assembly comprising a base 6 and a rotatable table 100. The base 6 preferably has two platforms 12 formed symmetrically on either side of the base 6. The rotatable table 100 is preferably rotatably mounted on the base 6 between the two platforms 12. The top surface 102 of rotatable 100 preferably lies flush with the top surfaces 104 of the two platforms 12. The combined surfaces 102, 104 of the rotatable table 100 and platforms 12, respectively, may form a work surface.

An extension arm 106 is rigidly attached to the rotatable table 100 which extends forward in well-known manner. The rotatable table 100 and extension arm 106 can pivot about a vertical axis through a range of angular positions. The angular movement is preferably restricted by the extension arm 106 engaging with one or other of the sides 108 of the platforms 12.

A locking lever 120 can be used to lock the rotatable table 100 and extension arm 106 in desired angular positions. A scale 122 is attached to the base 6 to indicate the angular position of the extension arm 106. Carrying handles 10 are attached to the sides of the base 6.

A mount 27 is preferably pivotally mounted on the rear of the rotatable table 100. The mount 27 can pivot about a horizontal axis on the rotatable table to enable the saw to perform bevel cuts. Two guide rods (not shown) are rigidly attached to a base 25 which is pivotally attached to the mount 27 via a pivot joint. A cutting unit 50 is preferably slideably mounted on the two guide rods.

The external housing of the cutting unit 50 may be constructed from four clam shells 300, 302, 304, 306. The first clam shell 300 preferably forms a motor housing in which an electric motor (not shown) is mounted. The clam shell 300 may be attached to the second clam shell 302 using bolts. The second and third clam shells 302, 304 are preferably attached to each other using bolts and form a guide rod support housing, in which the two guide rods are slideably mounted, and half of the fixed blade guard which surrounds the top section of a cutting blade 124 mounted on an output spindle (not shown) of the motor. The fourth clam shell 306 preferably attaches to the third clam shell 304 and forms the second half of the fixed blade guard.

Figure 2:
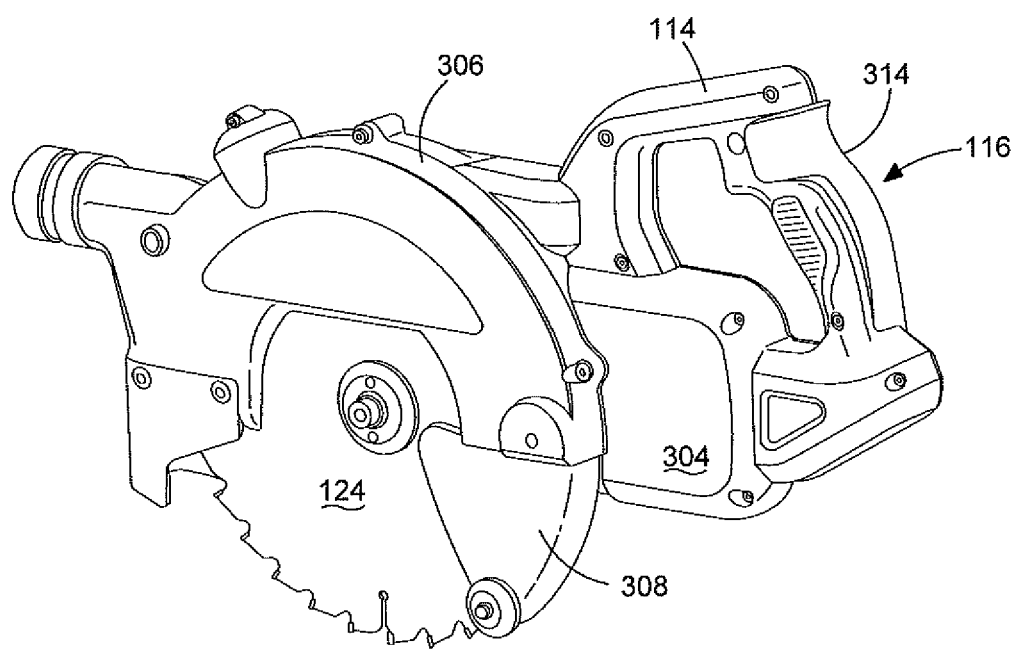
FIG. 2 shows the cutting unit together with the pivotal blade guard from a first perspective.
Figure 3:
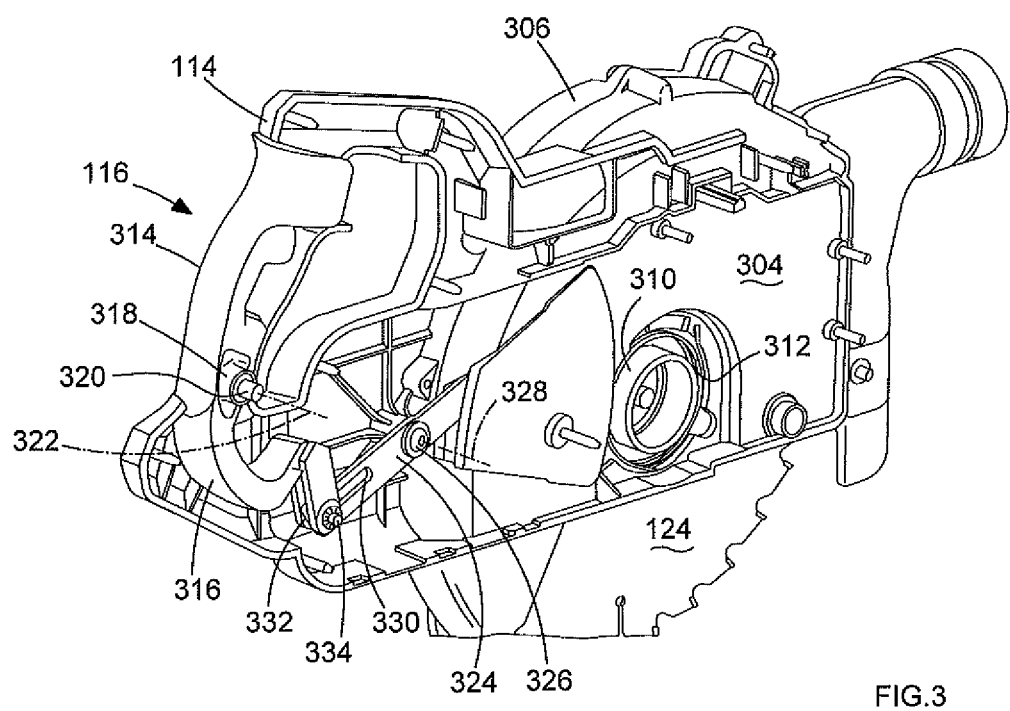
FIG. 3 shows a portion of the cutting unit from a second perspective, with the pivotal blade guard shown in a first position.
Figure 4:
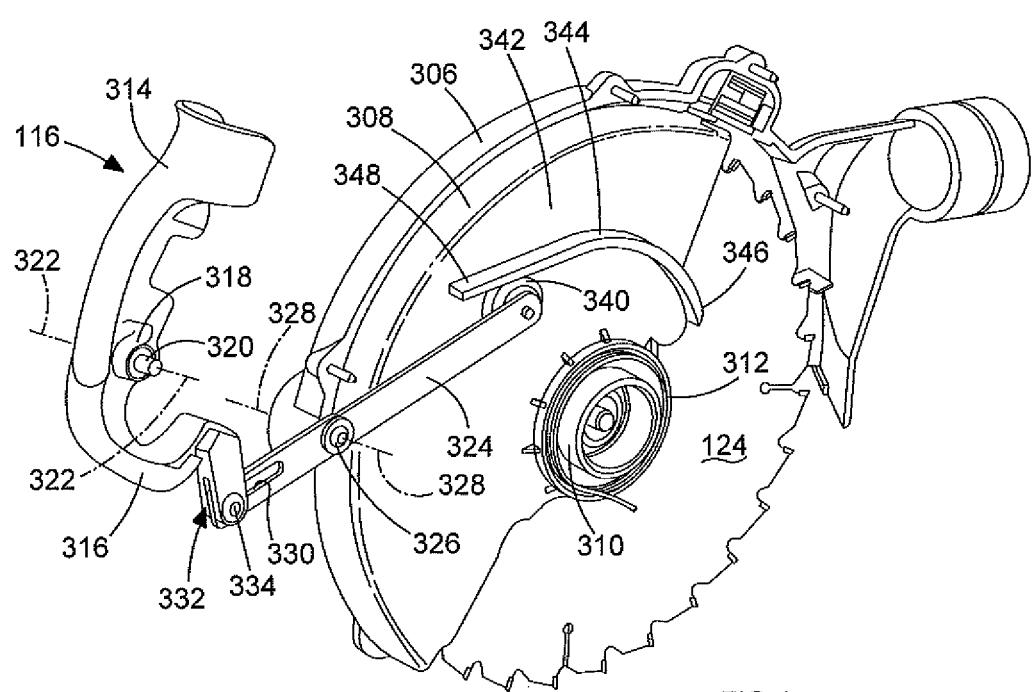
FIG. 4 shows the pivotal guard activation mechanism.
Figure 5:
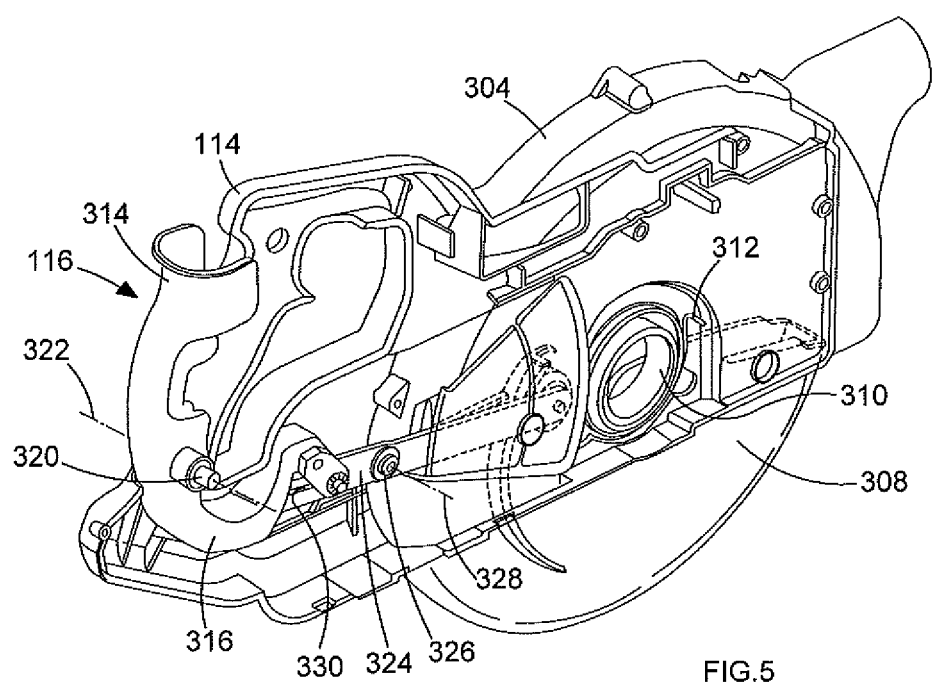
FIG. 5 shows a portion of the cutting unit from the second perspective, with the pivotal blade guard shown in the first position.

A pivotal blade guard 308 is preferably mounted on the third clam shells 304 in a pivotal manner and which is described in more detail below. The pivotal guard 308 can be moved from a first position (which is shown in FIG. 5) where it encloses the lower section of the cutting blade 124 (to prevent an operator from touching the lower cutting edge of the cutting blade 124) to a second position (which is shown in FIGS. 2, 3 and 4) where it is telescoped inside of the fixed guard 304, 306 to expose the lower section of the cutting blade 124 for cutting.

The pivot joint preferably enables the two rods and the cutting unit 50 to pivot about an axis relative to the mount 27 to enable the two rods 200 and the cutting unit 50 to pivot away from or towards the rotatable table 100 and extension arm 106. This enables the saw to perform chop cuts. A spring (not shown), which preferably forms part of the pivot joint, biases the mount 27 and guide rods to their highest position.

A handle 114 may be formed by the second and third clam shells 302, 304, and preferably extends from the front of the cutting unit 50 by which a user moves the cuffing unit 50 towards or away from the rotatable table 100 and extension arm 106. A pivotal hand lever 116 is preferably mounted on the handle 114 by which an operator can move the pivotal guard 308 and which is described in more detail below. An electric switch 118 may also mounted on the handle 114, the depression of which preferably activates the electric motor.

A fixed fence 16 may be rigidly attached on top of the two platforms 12 of the base 6 at the rear of the platforms 12. The fence 16 preferably extends across the rotatable table 100 but does not interfere with its rotational movement.

The pivotal guard control mechanism will now be described with reference to FIGS. 2 to 5. The pivotal guard 308 preferably includes a central hub 310 which is rotatably mounted on the third clam shell 304 of the cutting unit 50 to enable the pivotal guard 308 to pivot over a range of positions. The pivotal guard 308 can be pivoted (clockwise in FIG. 4) from a first position where it encloses the lower section of the cutting blade 124 to a second position where it is telescoped inside of the fixed guard 304, 306. A helical spring 312 preferably biases the pivotal guard 308 towards its first position.

The pivotal hand lever 116 is preferably mounted on the handle 114. The hand lever 116 preferably includes a first section 314 which is located on the outside of the handle 114 (as best seen in FIG. 2) connected to a second section 316 located on the inside of the handle 114 at a pivot point 318. The pivot point 318 may also comprise two arms 320 which locate in recesses formed in the inner wall of the second and third clam shells 302, 304 inside of the handle 114. The hand lever 116 preferably pivots on the arms 320 about an axis 322.

An elongate rod 324 may be pivotally mounted on the inner wall of the third clam shell 304. The rod 324 is preferably pivotally mounted on a bolt 326 which passes through a hole in the rod 324 and screws into the third clam shell 304. The rod 324 can pivot about an axis 328.

One end of the rod 324 preferably comprises an elongate slot 330. A lever slot 332 may be formed in the end of the second section 316 of the hand lever 116. A bar 334 preferably extends across the lever slot 332. The end of the rod 324 with the elongate slot 330 may pass through the lever slot 332. The bar 334 preferably extends through the elongate slot 330 of the rod 324. As the hand lever 116 is pivoted, the end of the second section 316 of the hand lever 116 will pivot towards or away from the pivotal guard 308, the bar 334 sliding back and forth along the elongate slot 330 as it does so. As the end of the second section 316 moves towards the pivotal guard 308, the bar 334 will move upwardly relative to the bolt 326 causing the end of the rod 324 with the elongate slot 330 to move upwardly as well. As such, the rod 324 pivots clockwise (as shown in FIG. 4) about the bolt 326. As the end of the second section 316 moves away from the pivotal guard 308, the bar 334 will move downwardly relative to the bolt 326 causing the end of the rod 324 with the elongate slot 330 to move downwardly as well. As such, the rod 324 pivots counter-clockwise (as shown in FIG. 4) about the bolt 326.

A freely rotatable wheel 340 may be mounted on an axle 328 on the second end of the rod 324, opposite to the end with the elongate slot 330. The axes of rotation of the hand lever 116, the rod 324 and the wheel 340 are preferably parallel to each other.

A cam wall 344 may be formed on a side wall 342 of the pivotal guard. The wheel 340 and cam wall 344 can act as a cam mechanism with the cam wall 344 acting as a cam and the wheel 340 as a cam follower. The cam wall 344 preferably spirals outwardly around the axis of pivot of the pivotal guard around the central hub 310 with the first end 346 of the cam wall 344 closest to the rear of the saw being closest to the hub 310 while the with the second end 348 of the cam wall 344 furthest from the rear of the saw being furthest away from the hub 310. The helical spring 312 preferably biases the pivotal guard 308 ant-clockwise as shown in FIG. 4.

This results in the cam wall 344 coming into engagement with the wheel 340. As the spring 312 urges the pivotal guard 308 counter-clockwise as shown in FIG. 4, the wheel 340 is urged to travel along the cam wall 344 towards the first end 346, the pivotal guard 308 and cam wall 344 rotating as it does so. As the wheel 340 travels along the cam wall 344, it approaches the first end 346 of the cam wall 344 closest to the hub 310. This results in the rod 324 pivoting clockwise (as shown in FIG. 4) about the bolt 326 as it does so. This in turn moves the end of the rod 324 with the elongate slot 330 upwards which in turn causes the section 316 of the hand lever 116 to rotate ant-clockwise about the axis 322 (as shown in FIG. 4). This results in the first section 314 also rotating counter-clockwise, moving the end of the first section 314 away from the external wall of the handle 114 (as shown in FIG. 5). As such, when no pressure is applied to the hand lever 116, the pivotal guard 308 is moved under the biasing force of the spring 312 to its first position, which in turn cause the rod 324 to pivot clockwise (as shown in FIG. 4) and the hand lever 116 counter-clockwise due to the camming action of the wheel 340 and the cam wall 344. The spring 312 preferably holds the pivotal guard 308 in its first position and the first section 314 of the hand lever 116 away from the handle 114.

When an operator wishes to open the pivotal guard 308, the operator applies a pressure to the first section 314 of the hand lever 116 moving it towards and into engagement with the outer surface of the handle 114. This results in the hand lever 116 pivoting in a clockwise direction (as shown in FIG. 4). This results in the bar 334 moving downwardly, the bar 334 sliding rearwardly within the elongate slot 330 of the rod 324. As this happens, the rod 324 is pivoted counter-clockwise (as shown in FIG. 4) forcing the wheel 340 to move away from the hub 310. This causes the wheel 340 to pivot the cam wall 344, due to the cam action between the cam wall 344 and wheel 340, clockwise (as shown in FIG. 4) in order for the second end 348 of the cam wall 344 wheel 340 to move towards the wheel 340 as the second end 348 being located further from the hub 310, the wheel 340 rolling along the side of the cam wall 344 as the cam wall pivots. The pivotal movement of the cam wall 344 results in pivotal movement of the pivotal guard 308. This movement is against the biasing force of the spring 312. This results in the pivotal guard 308 moving to its second position, exposing the lower edge of the, cutting blade 124 as shown in FIGS. 2, 3 and 4.

In order to move the pivotal guard back to its first position, the operator simply removes the pressure of the hand lever 116, and allow the spring 312 to move the pivotal guard back to its first position. The first section 314 of the hand lever 116 is preferably moved away from the handle 114 by the cam action of the wheel 340 on the cam wall 344 as the wheel 340 moves from the second end 348 towards the first end 346 as shown in FIG. 5.

While the present invention has been described in relation to a sliding compound miter saw, it will be appreciated that it is applicable to any saw with a pivotal guard.

The invention claimed is:

1. A saw comprising:
   a base assembly;
   a cutting unit pivotably mounted on the base assembly to allow the cutting unit to pivot towards or away from the base assembly, the cutting unit pivoting about a first axis away from or towards the base assembly,
   a circular saw blade rotationally mounted on the cutting unit which can be rotationally driven by a motor about a second axis;
   a fixed guard mounted on the cutting unit which surrounds at least a portion of the upper edge of the saw blade;
   a pivotal guard pivotally mounted on the cutting unit which can pivot from a first position, where it surrounds at least a portion of the lower edge of the saw blade to a second retracted position where the portion of the lower edge of the saw blade is exposed;
   a biasing mechanism which biases the pivotal guard towards the first position;
   a pivotal guard actuating mechanism which is capable of moving the pivotal guard from the first position to the second retracted position, the pivotal guard actuation mechanism comprising:
      a hand lever pivotally mounted on the cutting unit, the hand lever being disposed wholly forwardly of the first axis and at least partially forwardly of the second axis;
      a cam mechanism comprising a cam and cam follower connected between the hand lever and the pivotal guard wherein the cam is connected to the pivotal guard and the cam follower is connected to the hand lever;
   wherein the biasing mechanism urges the cam into engagement with the cam follower;
   wherein pivotal movement of the pivotal guard between the second position to the first position results in the movement of the cam follower from a first position to a second position along the cam;
   wherein, when the cam follower is in the second position along the cam, pivotal movement of the hand lever results in the cam follower being moved along the cam towards the first second position to pivot the pivotal guard towards the second position against the biasing force of the biasing mechanism.

2. The saw of claim 1 wherein the cam is a curved cam formed on a side of the pivotal guard.

3. The saw of claim 1 wherein the cam follower is a freely rotatable wheel.

4. The saw of claim 1 further comprising a rod pivotally mounted on the cutting unit and connected at one end to the hand lever, the cam follower being mounted on an other end of the rod, wherein pivotal movement of the hand lever results in a pivotal movement of the rod.

5. The saw of claim 4 wherein the hand lever connects to the rod via a second cam mechanism.

6. The saw of claim 5 wherein the second cam mechanism comprises an elongate slot formed in the end of the rod, and a bar mounted on the pivotal lever which is in sliding engagement with the elongate slot.

* * * * *